March 2, 1971          E. J. DOWER          3,566,699
APPARATUS FOR MEASURING LIQUID DENSITY
Filed June 23, 1969          2 Sheets-Sheet 2
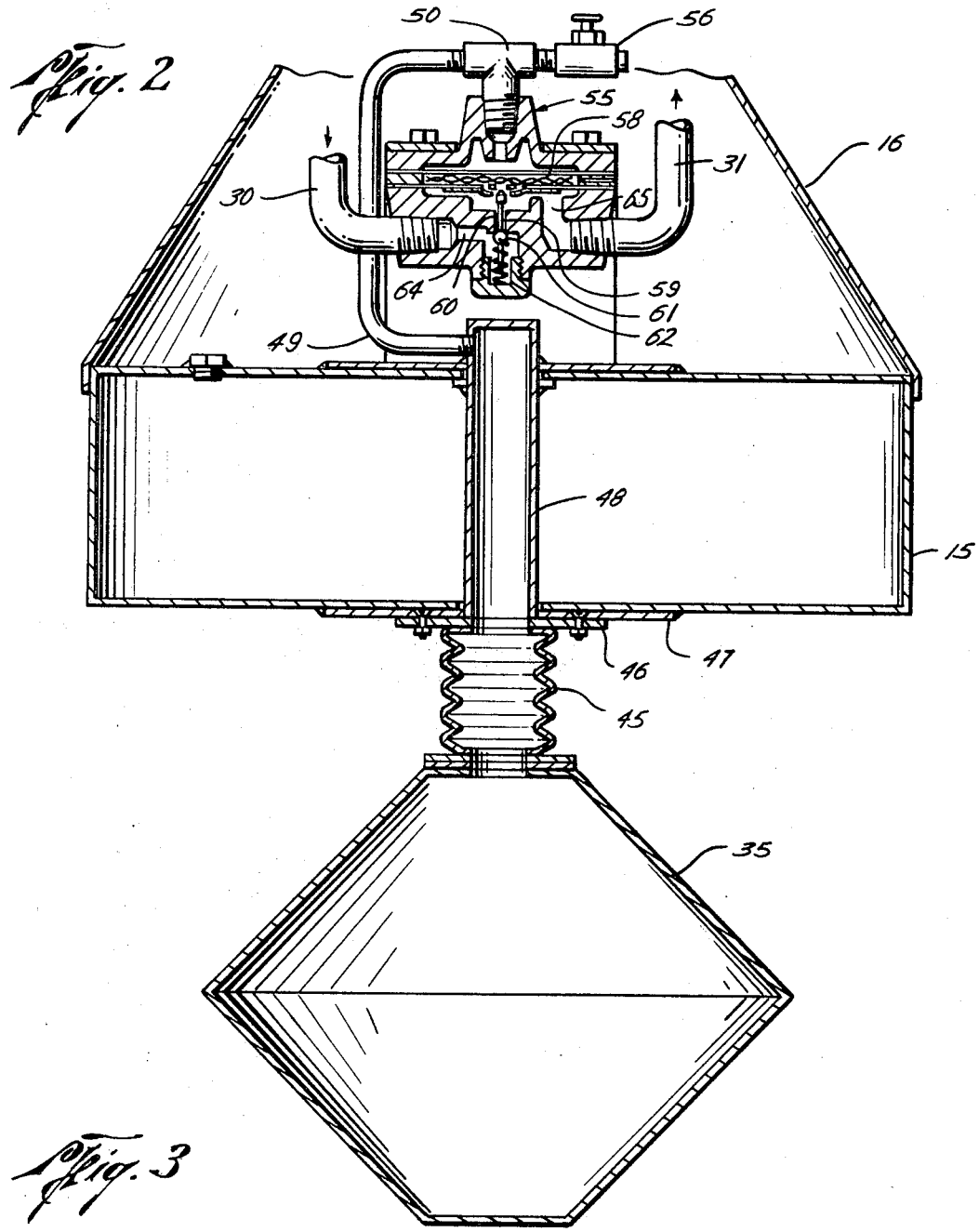
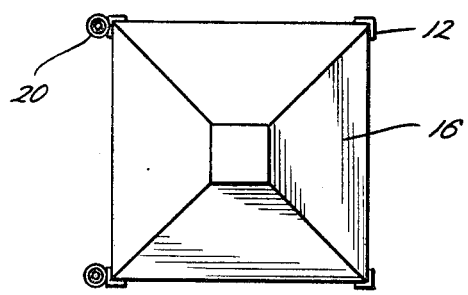
Ethell J. Dower
INVENTOR.
BY
Lee R. Larkin
ATTORNEY

United States Patent Office

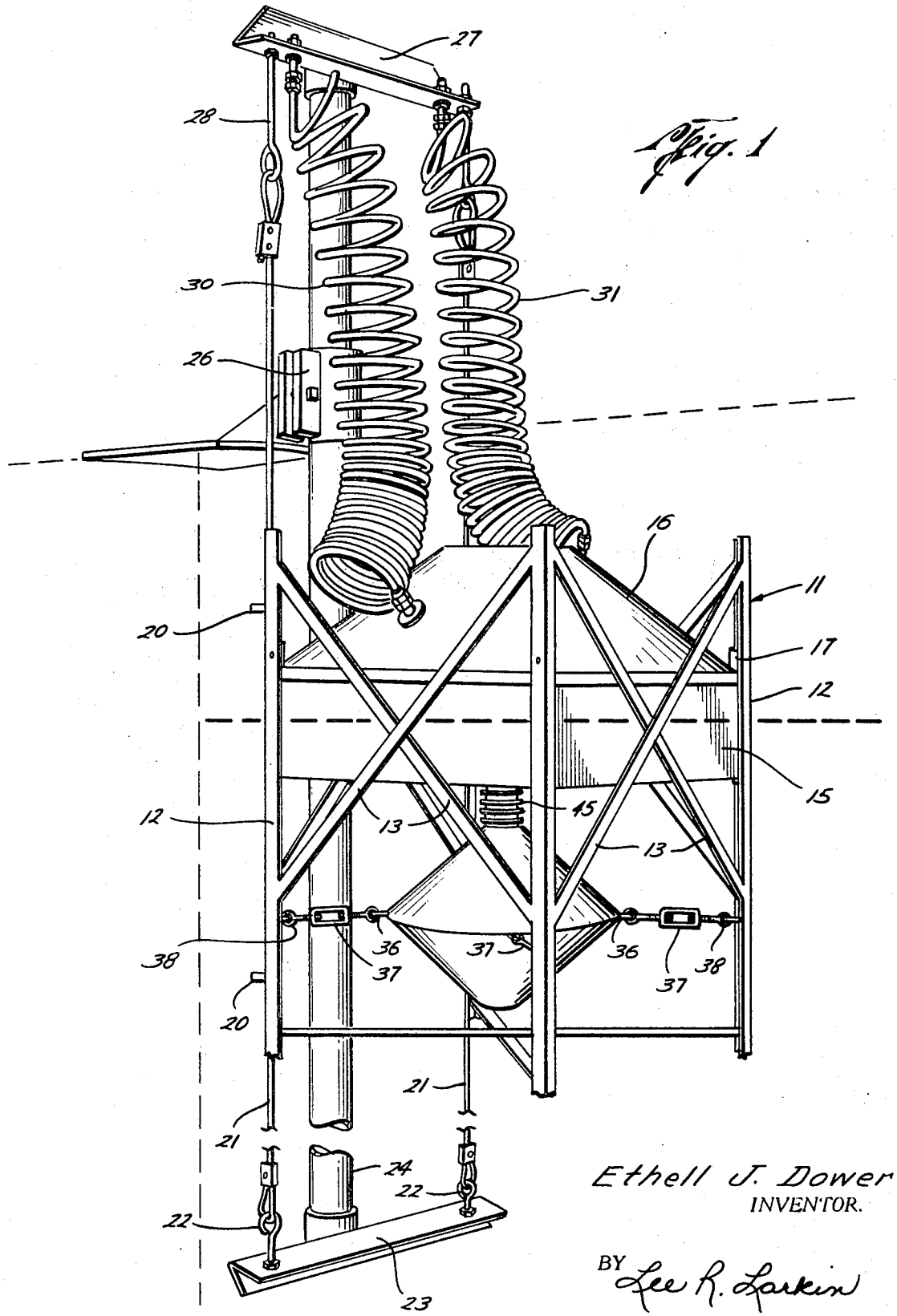

3,566,699
Patented Mar. 2, 1971

3,566,699
APPARATUS FOR MEASURING LIQUID DENSITY
Ethell J. Dower, Houston, Tex., assignor to Warren
Automatic Tool Company, Houston, Tex.
Filed June 23, 1969, Ser. No. 835,433
Int. Cl. G01n 9/10
U.S. Cl. 73—452
10 Claims

ABSTRACT OF THE DISCLOSURE

An apparatus for measuring the density of a liquid, as for example the density or mud weight of a drilling mud used for drilling oil wells and the like. It includes a first float arranged for floating in a liquid and a second float supported generally below the first float. Means are interposed between the two floats for sensing changes in the buoyancy force exerted by the second float relative to the first float caused by changes in density of the mud.

BACKGROUND OF THE INVENTION

Field of the invention

This invention relates to an apparatus for measuring the density of a liquid, such as the density of a drilling mud used for drilling oil wells, for example.

During such drilling operations, it is desirable to have a continuous readout of the weight of the drilling mud which is flowed into the well bore and which is flowed out of the well bore. By knowing the precise mud weight, then the operator can take such other actions as are necessary to either increase or decrease the mud weight in order to thereby keep the well under proper control without overpressuring the formations through which the drill bit is penetrating.

It is also desirable to have an apparatus which can work in an environment where mud spillage will not cause malfunctioning, which is simple of operation, which is relatively inexpensive to construct, and which will provide accurate readout of the mud weight.

Description of the prior art

Many prior art devices have been constructed for the general objective of measuring liquid density or mud weight. None of these have been fully satisfactory for various reasons including lack of accuracy in measurement, difficulty of operation, and frequent malfunctioning. U.S. Patent No. 2,910,871 granted to the present applicant is generally representative of the state of the art.

SUMMARY OF THE INVENTION

It is therefore an object of this invention to provide an improved apparatus for measuring density of a liquid which will overcome the aforesaid problems.

Briefly stated, the apparatus of this invention for measuring the density of a liquid includes a first float arranged for floating on the liquid. It also includes a second float supported generally vertically below the first float. It also includes means interposed between the first and second floats for sensing changes in the buoyancy force exerted by the second float relative to the first float, which changes are caused by changes in density of the liquid.

In certain embodiments, the sensing means includes a compressible coupling such as a bellows connected between the floats, with the coupling being filled with a fluid, preferably liquid, whereby changes in the buoyancy force are applied to the fluid. It may also include means for sensing changes in the pressure on the aforesaid fluid as indications of changes in the density of the mud.

Certain embodiments of the invention may include a pneumatic relay coupled with the fluid to provide a pneumatic signal of changes in the mud density, as well as appropriate readout or recording means.

In the more preferred embodiments, the unit is constructed such that the ratio between the volume displacement in gallons of the second float and the cross-sectional area in square inches of the coupling is about 1:1.

Additionally, the relay may be of the 1:1 ratio type whereby the upward buoyancy force exerted by the second float is directly proportional to the mud density and the readout signal provided by the pneumatic relay so that one pound per gallon change in mud density creates one pound per square inch pressure change in the pneumatic signal.

BRIEF DESCRIPTION OF THE DRAWINGS

Reference to the drawings will further explain the invention wherein:

FIG. 1 is generally an elevation view of one preferred embodiment of the invention showing it as it would be supported on the inside of a mud tank, for example.

FIG. 2 is an enlarged and fragmentary central sectional view of the two floats of the invention.

FIG. 3 is a generally top plan view of the upper float cover of the invention.

DESCRIPTION OF THE PREFERRED EMBODIMENT

The apparatus generally includes a support frame designated by the numeral 11 having four vertical members 12 at each corner thereof, which members are connected as by welding or the like by rigid cross-bars 13.

Frame 11 has mounted inside of and rigidly connected thereto an upper float 15 having a sufficient volume to float at the surface of the mud in the mud tank. Float 15 is provided with an appropriate removal cover 16 which is held in place by a hold down clamp 17 at each corner thereof, which clamps are removably attached to vertical members 21 by screws or the like.

The two generally rearward vertical members 12, as viewed in FIG. 1, are each provided with two vertically spaced cable eyes 20 which have passing therethrough a pair of guide cables 21 wrich are arranged for restraining lateral movement of frame 11, but which permit vertical movement of frame 11 and associated parts.

The lower ends of guide cables 21 are connected by eye bolts 22 to a lower T-head 23 which is supported at the lower end of support pipe 24.

The upper portion of support pipe 24 has tank clamp 26 attached thereto, which is arranged for hooking or otherwise securing to the upper edge of a mud tank, for example.

The extreme upward end of support pipe 24 has an upper T-head 27 which supports a pair of eye bolts 28, each of which is connected to an upper end of one of the cables 21. By taking up on eye bolts 28 appropriate tension can be applied to cables 21 to maintain them in a generally taut condition. Upper T-head 27 also supports a pair of flexible and coiled air lines 30 and 31, the lower ends of which are connected to cover 16 for transmission of air pressure to the sensing means which are to be described hereinafter.

Upper float 15 also has supported generally vertically therebelow a second or lower float 35 having a predetermined displacement volume. In the embodiment shown, it is generally in the shape of two cones held in back to back relationship. Float 35 has attached thereto four eyes 36 to each of which is connected a turn buckle 37, the opposite end of which connects to an eye bolt 38, which are connected to one of the vertical members 12. Turn buckles 37 restrain the lateral movement of float 35 to a very small distance, but still allow appreciable vertical movement. In this manner, turn buckles 37 do not exert any appreciable vertical force on float 35 which would detract from, or add to its buoyancy force.

The invention also includes means interposed between floats 15 and 35 for sensing changes in the buoyancy force exerted by float 35 relative to float 15, which changes are caused by changes in the density of the mud being measured. These sensing means conveniently take the form of a compressible coupling in the form of a metal bellows 45. The lower end of bellows 45 is attached to float 35, as by welding or the like and the upper end of bellows 45 is connected to a bellows flange 46 as by welding or the like. Flange 46 is connected to a lower disc 47 as by bolts or the like. Lower disc 47 is in turn connected to float 15 by welding or the like.

The upper end of bellows 45 is open and communicates, through the central opening in bellows flange 46, with a fluid chamber formed by upstanding tubular member 48. The lower end of tubular member 48 is connected as by welding to lower disc 47 and forms a fluid well which communicates with the inside of bellows 45. Tubular member 48 has the upper end thereof closed and is connected to bellows connecting tube 49 which leads to an arm of upper T connector 50, the leg of which communicates with a 1:1 ratio volume booster pneumatic relay generally designated by the numeral 55. The other arm of connector 50 is connected to a bleed valve 56, the purpose of which will be explained hereinafter.

T connector 50 communicates with one side of flexible diaphragm 58 in relay 55. The lower side of the diaphragm 58 butts against a valve stem 59 extending through orifice 60, the lower end of which is arranged to be closed by enlarged ball 61 formed with stem 59. Stem 59 is biased upwardly by spring 62 to normally close orifice 60.

Air line 30 is provided with a regulated 20 p.s.i. air supply and connects with lower chamber 64 of relay 55. Air line 31 communicates with upper chamber 65 of relay 55, with air line 41 being capable of transmitting an appreciable volume of air at a pressure equal to the pressure on the opposite side of the diaphragm 58. Air line 31 is connected to a convention 3–15 p.s.i. recorder, and/or receiver gauge, or other readout means (not shown). It is to be understood that communication between upper chamber 65 and lower chamber 64 is through orifice 60 controlled by valve ball 61.

Bellows 45, tube 49 and T connector 50 are filled with a fluid such as water for the purpose of transmitting and applying pressure against diaphragm 58. Air line 31 may have a pneumatic snubber inserted therein to reduce transit signals resulting from turbulent mud conditions in the mud tank.

In the preferred embodiment, lower float 35 has a displacement volume of 1.05 gallons. In addition, bellows 45 has an internal cross-sectional area of 1.05 square inches whereby the ratio between the volume displacement in gallons of float 35 and the cross-sectional area in square inches of bellows 45 is about 1:1.

The tool of this invention operates on a displacement and buoyancy principal. Lower float 35 displaces 1.05 gallons volume and is held below the surface of the mud in the mud pit. The upward buoyancy force exerted by float 35 is proportional to the density of the fluid sample. This buoyancy force acts against bellows 45 having the aforesaid effective area of 1.05 square inches. Since bellows 45 is liquid filled there is essentially no movement or change in volume as the upward force is changed. In this device, float 35 and bellows 45 are sized for convenience so that 1 pound per gallon change in density of the mud creates 1 pound per square inch pressure change in bellows 45. Since relay 55 is fluid coupled to bellows 45, as explained above, and since relay 55 is of the 1:1 ratio type, the output on line 31 varies according to the density of the mud which float 35 is displacing.

Preferably upper float 15 is sized so that, it together with frame 11 and float 35, will float in a liquid having a density of 8 pounds per gallon or more. Moreover, float 15, together with frame 11, will supply sufficient weight to keep float 35 submerged in a liquid of up to 20 pounds per gallon in density. It is important that the device be so arranged that float 35 is completely submerged.

As stated above, float 15 and frame 11 are arranged for floating on the surface of the mud tank and are free to rise and fall with the mud level. They are restrained from lateral movement by the aforesaid guide cables 21.

The desired range of density measurement is from 8 to 20 pounds per gallon, which conveniently matches the signal pressure range of 3–15 p.s.i. As previously stated, one pound per gallon change in mud density equals one pound per square inch pressure change.

The weigh of the displacer float 35 is made such that when submerged in fluid having a density of eight pounds per gallon, the net bouyant force (displacement times fluid density less weight) upward on filled bellows 45 creates a pressure slightly in excess of the 3 p.s.i.

With the device oeprating in a known density fluid (for example water at 8.35 pounds per gallon) the transmitted pressure is in excess of 3.35 p.s.i., so a small amount of water is allowed to bleed out of the filled bellows system until the transmitted signal pressure is exactly as desired at 3.35 p.s.i. This method of making the fine adjustment through the measuring range is as follows:

With the bellows 45 filled in its relaxed condition, all of the upward force by displacer float 35 is converted into fluid pressure inside of bellows 45. As the fluid is withdrawn from the closed system through valve 56, the bellows is compressed and its natural spring rate times the distance compressed creates a downward force to bias out part of the buoyant force of float 35.

Air lines 30 and 31 are flexible to accommodate for free rise and fall of the device in the mud tank and removal of cover 16 when desired.

The foregoing description is to be construed as illustrative only and further modifications will be evident to those skilled in the art in view of this description.

What is claimed is:

1. In apparatus for measuring the density of a liquid, the combination comprising:
   a first float arranged for floating in said liquid;
   a second float supported generally vertically below said first float;
   compressible means mounted between said first and second floats for sensing changes in the buoyancy force exerted by said second float on said first float caused by changes in density of said liquid;
   and, means for sensing changes in said buoyancy force as indications of changes in density of said liquid.

2. The invention as claimed in claim 1 wherein:
   said compressible means includes a compressible coupling connected between said floats, said coupling being filled with a fluid, whereby said changes in said buoyancy force are applied to said fluid.
   and, said sensing means includes means for sensing changes in pressure of said fluid as indications of said changes in density of said liquid.

3. The invention as claimed in claim 2 wherein:
   said coupling is in the form of a bellows.

4. The invention as claimed in claim 2 wherein:
   said pressure sensing means includes a pneumatic relay coupled with said fluid.

5. The invention as claimed in claim 4 including:
   means connected to said relay for recording changes in pressure transmitted thereby as indications of changes in density of said fluid.

6. In apparatus for measuring drilling mud density, the combination comprising:
   a first float arranged for floating generally at the surface of said mud;
   a second float supported generally vertically below said first float and arranged to displace a predetermined quantity of said mud;
   and, compressible means connected between said first and second floats for sensing changes in the buoyancy force exerted by said second float on said first float caused by changes in density of said mud.

7. The invention as claimed in claim 6 wherein:
   said compressible means includes a compressible coupling connected between said floats, said coupling having a confined liquid therein, whereby said changes in buoyancy force are applied to said liquid;
   and, including means for sensing changes in pressure on said liquid as indications of said changes in density of said mud.

8. The invention as claimed in claim 6 including:
   means for supporting said floats in said vertically spaced and floating relationship in a mud tank and restraining lateral movement thereof.

9. The invention as claimed in claim 7 wherein:
   the ratio between the volume displacement in gallons of said second float and the cross-sectional area in square inches of said coupling is about 1:1.

10. The invention as claimed in claim 9 wherein:
    said means for sensing changes in pressure on said liquid includes a 1:1 ratio pneumatic relay coupled with said liquid.

References Cited
UNITED STATES PATENTS

| | | | |
|---|---|---|---|
| 533,153 | 1/1895 | Willard | 73—447 |
| 1,526,850 | 2/1925 | Davis | 73—447 |
| 1,604,387 | 10/1926 | Caldwell | 73—452 |
| 1,817,315 | 8/1931 | Knapp | 73—141 |
| 2,451,036 | 10/1948 | Martin | 73—452 |
| 2,680,967 | 6/1954 | Newman | 73—141X |
| 3,222,918 | 12/1965 | Kuntz | 73—453X |

RICHARD C. QUEISSER, Primary Examiner

C. E. SNEE III, Assistant Examiner

U. S. PATENT OFFICE

UNITED STATES PATENT OFFICE
CERTIFICATE OF CORRECTION

Patent No. 3,566,699　　　　　　　　　　　Dated March 2, 1971

Ethell J. Dower

It is certified that error appears in the above-identified patent and that said Letters Patent are hereby corrected as shown below:

Column 2, line 43, the numeral "21" should read --12--; line 47, "wrich" should read --which--.
Column 3, line 44, the numeral "41" should read --31--; line 47, "convention" should read --conventional--.
Column 4, line 22, "weigh" should read --weight--; line 27, "oeprating" should read --operating--.

Signed and sealed this 3rd day of August 1971.

(SEAL)
Attest:

EDWARD M. FLETCHER, JR.　　　　　WILLIAM E. SCHUYLER, JR.
Attesting Officer　　　　　　　　　Commissioner of Patents